(12) United States Patent
Hanson

(10) Patent No.: US 8,352,440 B2
(45) Date of Patent: Jan. 8, 2013

(54) USING REPEATED INCREMENTAL BACKGROUND CONSISTENCY CHECKING TO DETECT PROBLEMS WITH CONTENT CLOSER IN TIME TO WHEN A FAILURE OCCURS

(75) Inventor: David Aaron Hanson, Lake Forest, CA (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 12/825,313

(22) Filed: Jun. 28, 2010

(65) Prior Publication Data

US 2011/0320412 A1    Dec. 29, 2011

(51) Int. Cl.
*G06F 7/00* (2006.01)
(52) U.S. Cl. ......................................... 707/690; 707/692
(58) Field of Classification Search .................... None
See application file for complete search history.

(56) References Cited

U.S. PATENT DOCUMENTS

| | | | |
|---|---|---|---|
| 5,632,012 A * | 5/1997 | Belsan et al. | 714/6.12 |
| 7,434,012 B1 * | 10/2008 | Ives et al. | 711/159 |
| 7,461,206 B2 | 12/2008 | Bhanoo et al. | |
| 7,464,064 B1 | 12/2008 | Smith | |
| 7,650,354 B2 | 1/2010 | Takahashi | |
| 2005/0187983 A1 | 8/2005 | Narang et al. | |
| 2005/0223046 A1 * | 10/2005 | Smith | 707/200 |
| 2007/0244936 A1 | 10/2007 | Schlomer et al. | |
| 2008/0059517 A1 | 3/2008 | Glania et al. | |
| 2008/0189343 A1 | 8/2008 | Hyer et al. | |
| 2008/0222150 A1 | 9/2008 | Stonecipher | |
| 2008/0256299 A1 | 10/2008 | Iyengar et al. | |
| 2009/0106603 A1 * | 4/2009 | Dilman et al. | 714/42 |
| 2009/0144695 A1 | 6/2009 | Vairavan et al. | |
| 2009/0254693 A1 | 10/2009 | Karamanolis et al. | |
| 2010/0005374 A1 | 1/2010 | Brown et al. | |

OTHER PUBLICATIONS

Heitmeyer, C.L., R.D. Jeffords, and B.G. Labaw, "Automated Consistency Checking of Requirements Specifications", ACM Transactions on Software Engineering and Methodology, vol. 5, No. 3, Jul. 1996, 31 pp.

(Continued)

*Primary Examiner* — Debbie Le
*Assistant Examiner* — Anh Tai Tran
(74) *Attorney, Agent, or Firm* — Janaki K. Davda; Konrad, Raynes, Davda & Victor LLP

(57) ABSTRACT

Provided are techniques for identifying an incremental consistency checking job. During a run of the incremental consistency checking job, one or more queries are issued for a set of content holding objects in an object repository. For each of the issued one or more queries, whether content in the set of content holding objects in the object repository and associated content elements in the content repository is consistent is verified; in response to determining that content is not consistent, one or more inconsistencies are recorded; in response to determining that a desired number of content elements to process in each time interval has been reached and not all of the content holding objects in the object repository have been processed, the incremental consistency checking job is scheduled for a subsequent run; and, in response to determining that all of the content holding objects in the object repository have been processed, the incremental consistency checking job is marked as complete and a new incremental consistency checking job is scheduled.

20 Claims, 6 Drawing Sheets

OTHER PUBLICATIONS

IBM Corp., "Storage Area Consistency", [online], [retrieved on Jun. 1, 2010], retrieved from the Internet at <URL: http://publib.boulder.ibm.com/infocenter/p8docs/v4r5m1/topic/com.ibm.p8.doc/ce_help/con . . . >, 2 pp.

Yu, H., and A. Vahdat, "Consistent and Automatic Replica Regeneration", ACM Transactions on Storage, vol. 1, No. 1, Dec. 2004, 35 pp.

* cited by examiner

USING REPEATED INCREMENTAL BACKGROUND CONSISTENCY CHECKING TO DETECT PROBLEMS WITH CONTENT CLOSER IN TIME TO WHEN A FAILURE OCCURS

BACKGROUND

1. Field

Embodiments of the invention relate to using repeated incremental background consistency checking to detect problems with content closer in time to when a failure occurs.

2. Description of the Related Art

A content management system may be described as a software system used to store and manage content holding objects and other objects (e.g., folders to organize, for example, content holding objects and folders) in a computer system. For example, the content management system includes an object repository that stores the content holding objects and other objects. For content holding objects, the object repository contains metadata including the one or more locations of the content elements. The content elements are stored in a separate storage repository.

Thus, the content holding objects stored and managed by the content management system may be associated with any type of computer files in any computer readable format, including text files, documents, annotations, picture files, video files, sound files, etc. In general, the files may be called content elements. Each computer file may be described as a separate content element (i.e., the file itself is not composed of multiple content elements) and stores actual content.

The content management system can maintain multiple versions of the content holding objects and other objects managed and meta-data for each content holding object. The content management system allows users (e.g., humans and machines) to create, access, modify, and delete content holding and other objects, among other operations.

A content holding object is associated with one or more content elements, and the content file may be stored as one or more content elements. For example, multi-page documents (e.g., MICROSOFT® Word documents or Portable Data Format (PDF) documents may be stored as a single content element. (MICROSOFT is a registered trademark of Microsoft Corporation in the United States and/or other countries.) Multiple pages of the same document may be associated with multiple content elements when a paper document is scanned in and each content element is stored as a separate image file. Also, an application using a content management system may manage multiple content elements on a content holding object in application specific ways.

Content management applications are applications built using a content management system. For example, a vendor may sell a content management system, and the buyer may build a management application to solve a business problem using the content management system. A content management application is composed of one or more programs.

In some content management systems, under certain adverse conditions, it is possible for content elements stored in a storage repository to become inconsistent with the information (i.e., metadata and location of the content file) stored for the content element in an object repository. For example, the necessary content element may be missing from the storage repository, while the information in the object repository still points to the location of the missing element. As another example, the content element may be a different size than is described in the metadata for that content element in the object repository. Although rare, these inconsistencies may occur for a variety of reasons. For example, a network file device might not have had an adequate backup power supply when there was a power failure, and, then, after power was restored, it may have been necessary to restore the storage device from a backup and that backup was not completely in sync with the object database backup.

Some content management systems have a content consistency checker tool that can be run to detect inconsistencies between the information in the object repository and the actual content element. A customer may run this tool after certain conditions, such as after restoring a storage device from backup. Sometimes problems (i.e., errors) are not detected right away, however, and may go unnoticed for weeks or even months. When the problem does surface, it is often difficult to determine why the problem occurred.

Thus, there is a need for using repeated incremental background consistency checking to detect problems with content closer in time to when a failure occurs.

BRIEF SUMMARY

Provided are a method, computer program product, and system for identifying an incremental consistency checking job. During a run of the incremental consistency checking job, one or more queries are issued for a set of content holding objects in an object repository. For each of the issued one or more queries, whether content in the set of content holding objects in the object repository and associated content elements in the content repository is consistent is verified; in response to determining that content is not consistent, one or more inconsistencies are recorded; in response to determining that a desired number of content elements to process in each time interval has been reached and not all of the content holding objects in the object repository have been processed, the incremental consistency checking job is scheduled for a subsequent run; and, in response to determining that all of the content holding objects in the object repository have been processed, the incremental consistency checking job is marked as complete and a new incremental consistency checking job is scheduled.

BRIEF DESCRIPTION OF THE SEVERAL VIEWS OF THE DRAWINGS

Referring now to the drawings in which like reference numbers represent corresponding parts throughout:

FIG. 3 is formed by FIGS. 3A and 3B.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
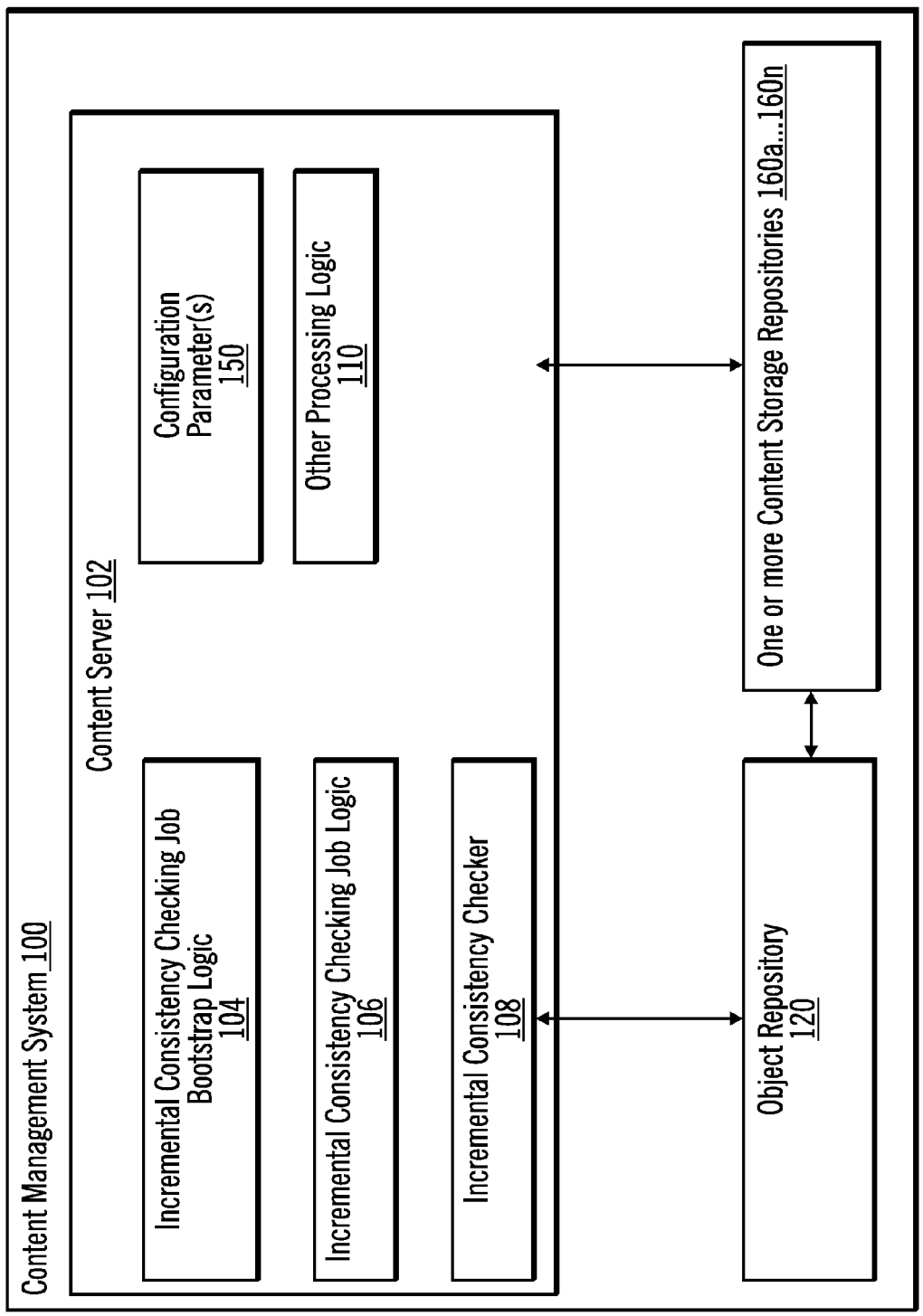
FIG. 1 illustrates a content management system in accordance with certain embodiments.

FIG. 1 illustrates a content management system 100 in accordance with certain embodiments. A content server 102 is coupled to an object repository 120 and one or more content storage repositories 160a . . . 160n. The object repository 120 and one or more content storage repositories 160a . . . 160n are illustrated in more detail in FIG. 2 in accordance with certain embodiments. In various embodiments, there may be many different types of content storage repositories 160a . . . 160n (from a network file system to an external database (separate from the object repository) to mass storage devices that enforce additional semantics about the content such as retention periods).

The content server 102 includes an incremental consistency checking job bootstrap logic 104, an incremental consistency checker 108, one or more configuration parameters 150, and other processing logic 110.

Figure 2:
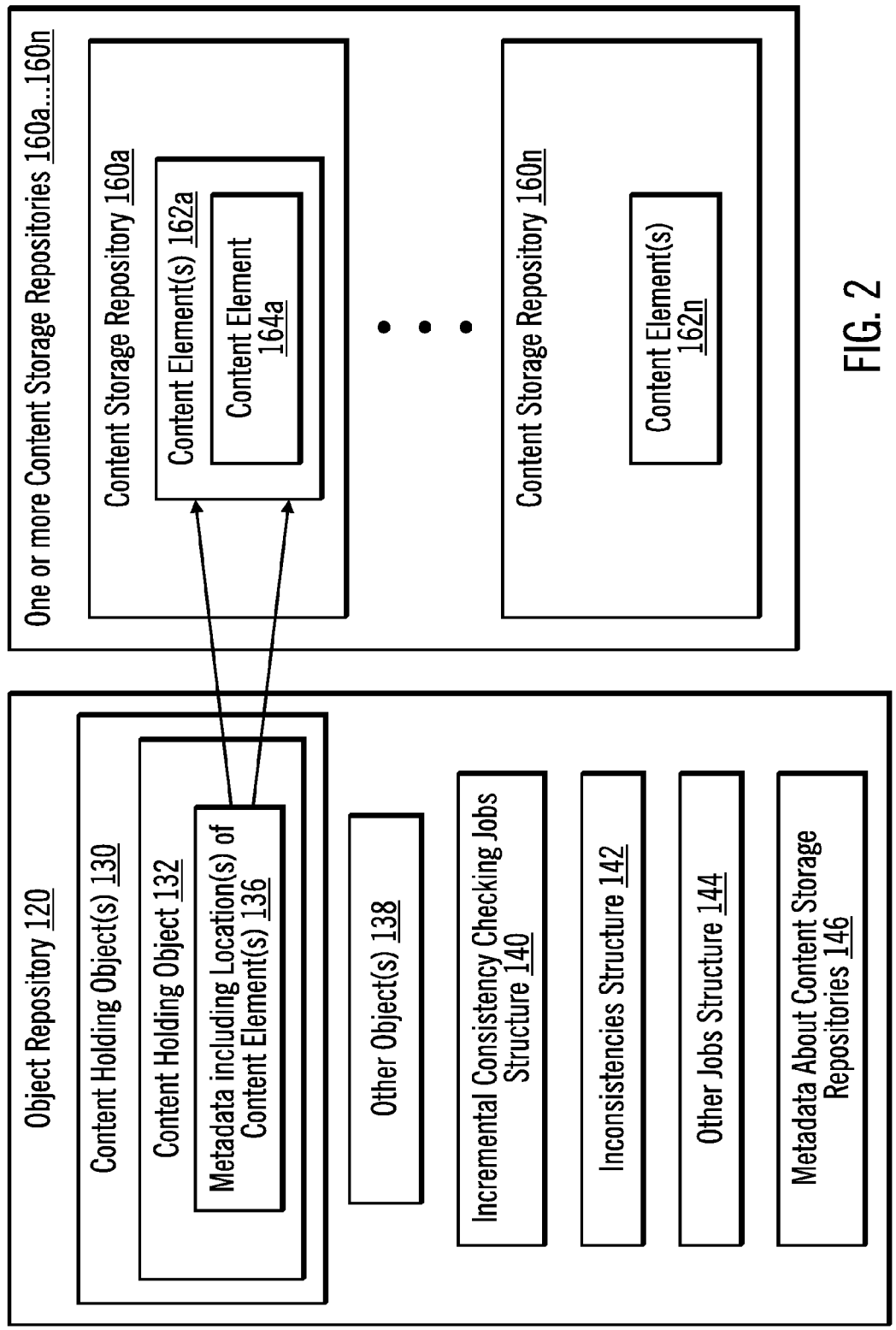
FIG. 2 illustrates further details of an object repository and one or more content storage repositories in accordance with certain embodiments.

The object repository 120 is illustrated in FIG. 2. In certain embodiments, the object repository 120 is implemented as an object database. The object repository 120 includes content holding objects 130, other objects 138.

Each content storage repository 160a . . . 160n includes content of one or more content elements 162a . . . 162n. The ellipses between content storage repository 160a and content storage repository 160n represent that there are one or more content storage repositories 160a . . . 160n. Content element 164a is an example content element in the one or more content elements 162a . . . 162n. For each content element 162a . . . 162n stored in a content storage repository 160a . . . 160n, the object repository 120 includes one or more content holding objects 130. Each content holding object 130, such as content holding object 132, includes metadata 136 that includes one or more locations of one or more content elements 162a . . . 162n. For example, for content elements 162a . . . 162n, the object repository 120 stores a content holding object 132 including metadata 136 that stores the one or more locations of specific content elements 162a . . . 162n held by the content holding object 132. In certain embodiments, the object repository 120 is a database with a row for each content holding object 130 and other objects 138 (e.g., non-content holding objects, folders to organize, for example, content holding objects and other folders, etc.). A row in the database holds metadata about the content, including the one or more locations of each content element. A content holding object 130 may be said to hold one or more content elements 162a . . . 162n. Thus, in the object repository 120, the metadata about a content holding object 130 holds the location information about the one or more content elements 162a . . . 162n.

In addition, the object repository 120 includes an incremental consistency checking jobs structure 140, an inconsistencies structure 142, an other jobs structure 144, and metadata about content storage repositories 146. The other jobs structure 144 stores, for example other background jobs managed by the content management system 100. In certain embodiments, the incremental consistency checking jobs structure 140 may be based on other jobs already present in the content management system 100. The metadata about content repositories 146 contains, for example, a count of all content elements 162a . . . 162n referenced by the object repository 120 for a particular content repository 160a . . . 160n. The metadata about content repositories 146 is referenced when estimating a number of content elements to process each incremental time interval. Herein, "time span" is used to refer to the overall time span that the checking is spread across, and "time interval" is used to refer to an individual incremental time interval (i.e., a single incremental time slot) (which is described in further detail with reference to FIG. 4).

The incremental consistency checker 108 incorporates consistency checking into background processing within the content server 102 to provide a proactive approach to identifying consistency problems (i.e., inconsistencies) closer to the time that they occur. Such background processing has the following characteristics:

1. The content verification process operates in an incremental fashion spread out over some configurable length of time across which to spread the incremental consistency checking job (e.g., several days or weeks). Content verification may be described as performing various checks that are applicable to the type of content storage repository 160a . . . 160n. That is, the types of checks are related to the content repository 160a . . . 160n. For example, for a network file device, content verification includes checking whether a file exists at the location stored for that content element in the object repository 120. Also, content verification includes checking whether the size of the file matches. The specific checks that can be made are dependent on and vary by type of content storage repository 160a . . . 160n. Embodiments are directed to the process for managing this consistency checking in an incremental, continuous fashion, independent of any technique for verifying the content. In various embodiments, various techniques may be used to verify the content itself. Spreading out the content verification over time reduces the burden this processing has on the rest of the system. It might also be desirable to have the processing only occur during certain off-peak hours of the day.

2. The background verification process runs repeatedly. The background verification process may be described as carrying out the verification steps in the background of the content server 102 processing. When the object repository 120 has been verified, the background verification process repeats, thus, operating in a repeated fashion.

3. When inconsistencies are detected, an administrator or operator or other user is notified of the condition using a variety of techniques. For example, various message passing schemes can be used to pass notification messages to an administration application. As another example, a publisher-subscriber pattern can be utilized for this message passing. The content server 102 publishes these messages to any interested applications that have subscribed to these messages.

Figure 3A:
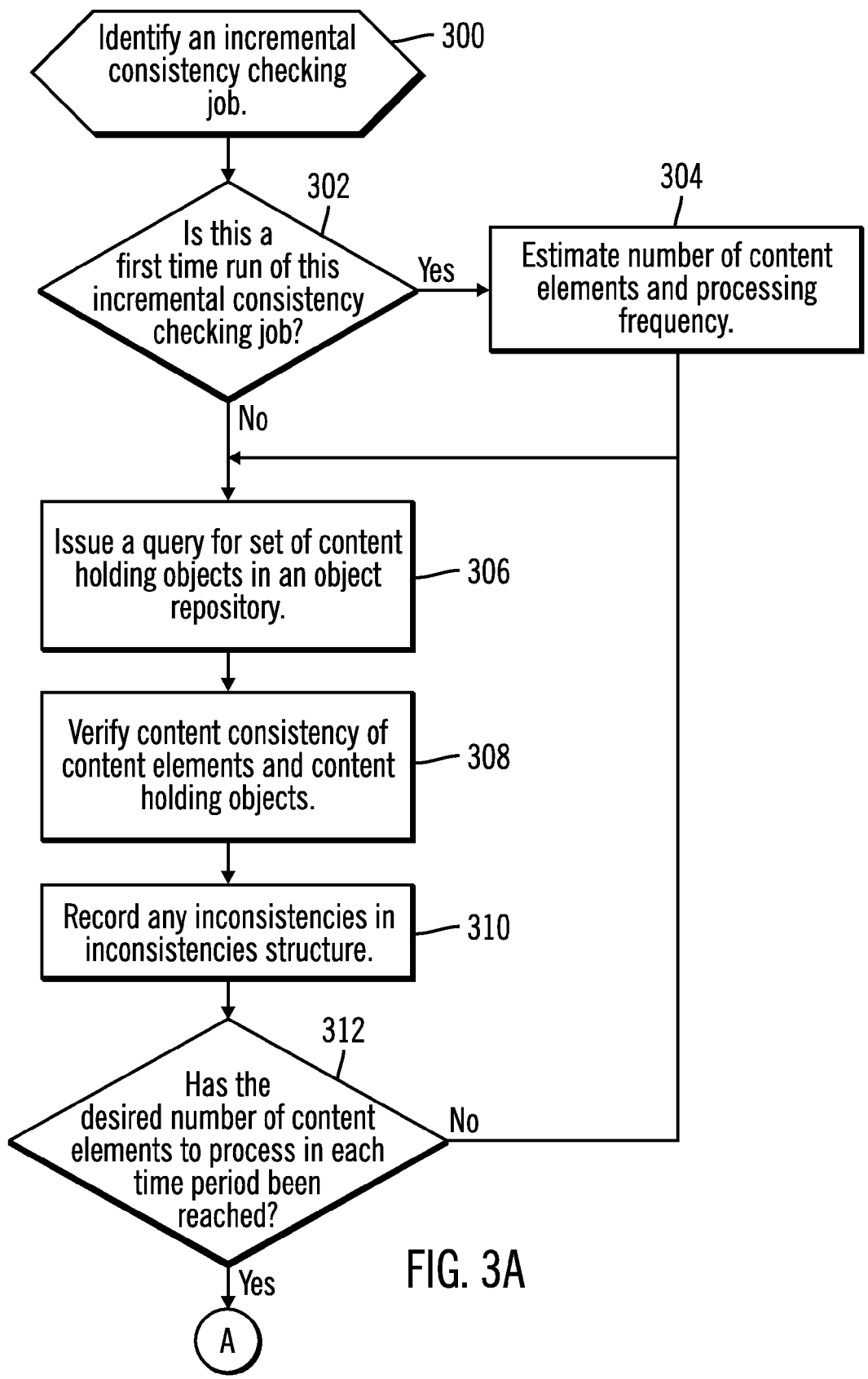
FIG. 3 illustrates logic performed by an incremental consistency checker in accordance with certain embodiments.
Figure 3B:
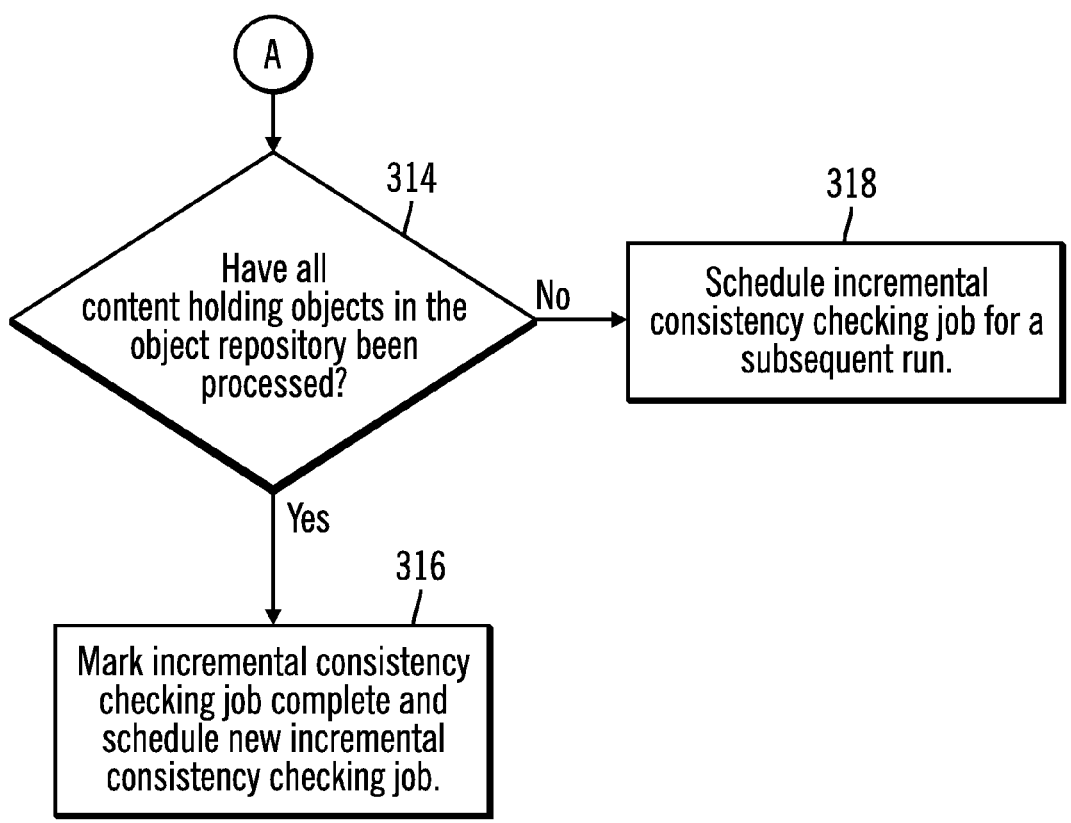

FIG. 3 illustrates logic performed by the incremental consistency checker 108 in accordance with certain embodiments. Control begins in block 300 with the incremental consistency checker 108 identifying an incremental checking job (e.g., in the incremental consistency checking jobs structure 140). In block 302, the incremental consistency checker 108 determines whether this is a first time run of this consistency checking job. If so, processing continues to block 304, otherwise, processing continues to block 306. The start of this flow diagram is the start of a consistency checking job. The consistency checking job was scheduled either by the incremental consistency checking job bootstrap logic 104 or was scheduled at the end of a previous incremental consistency checking job when it completed.

In block 304, the incremental consistency checker 108 estimates a number of content elements 162a . . . 162n and processing frequency (which is described in more detail with reference to FIG. 4). From block 304, processing continues to block 306. In embodiments, various techniques may be used to calculate how often to schedule the incremental consistency checking job and how many content elements 162a . . .

162n of associated content holding objects 132 in the object repository 120 to process each time interval.

In block 306, the incremental consistency checker 108 issues a query for a set of content holding objects in the object repository 120. In certain embodiments, the set includes a portion of the content holding objects in the object repository 120. In certain embodiments, the set includes all of the content holding objects in the object repository 120. In block 308, the incremental consistency checker 108 verifies content consistency of the content elements 162a . . . 162n and the content holding objects 130. In block 310, the incremental consistency checker 108 records any inconsistencies in the inconsistencies structure 142. In block 312, the incremental consistency checker 108 determines whether the desired number of content elements to 162a . . . 162n process each incremental time interval been reached. That is, multiple queries may be issued to process all desired content elements 162a . . . 162n in a time interval. If so, processing continues to block 314 (FIG. 3B), otherwise, processing loops back to block 306 (to generate another query).

In block 314, the incremental consistency checker 108 determines whether all content holding objects 130 in the object repository 120 been processed. If so, processing continues to block 316, otherwise, processing continues to block 318.

In block 316, the incremental consistency checker 108 marks the incremental consistency checking job as complete and schedules a new incremental consistency checking job. That is, in block 316, the incremental consistency checker 108 completes this incremental consistency checking job and schedules a new incremental consistency checking job to run sometime in the future. The new incremental consistency checking job enters this flow at block 300 as a first-time run.

In block 318, the incremental consistency checker 108 schedules the just run incremental consistency checking job for a subsequent run. That is, in block 318, the incremental consistency checker 108 schedules (i.e., re-schedules) the job to run at the next time interval, which will enter this flow of steps at block 300 as a subsequent run.

Thus, at the end of this incremental consistency checking job run, the incremental consistency checker 108 checks whether the incremental consistency checking job is completely done or whether additional time intervals are needed. If additional time intervals are needed, then the incremental consistency checker 108 schedules the incremental consistency checking job for a subsequent run. If completely done, the incremental consistency checker 108 marks this incremental consistency checking job as complete and schedules a new incremental consistency checking job to run for the first time at the next time when the consistency checking process should be repeated.

Figure 4:
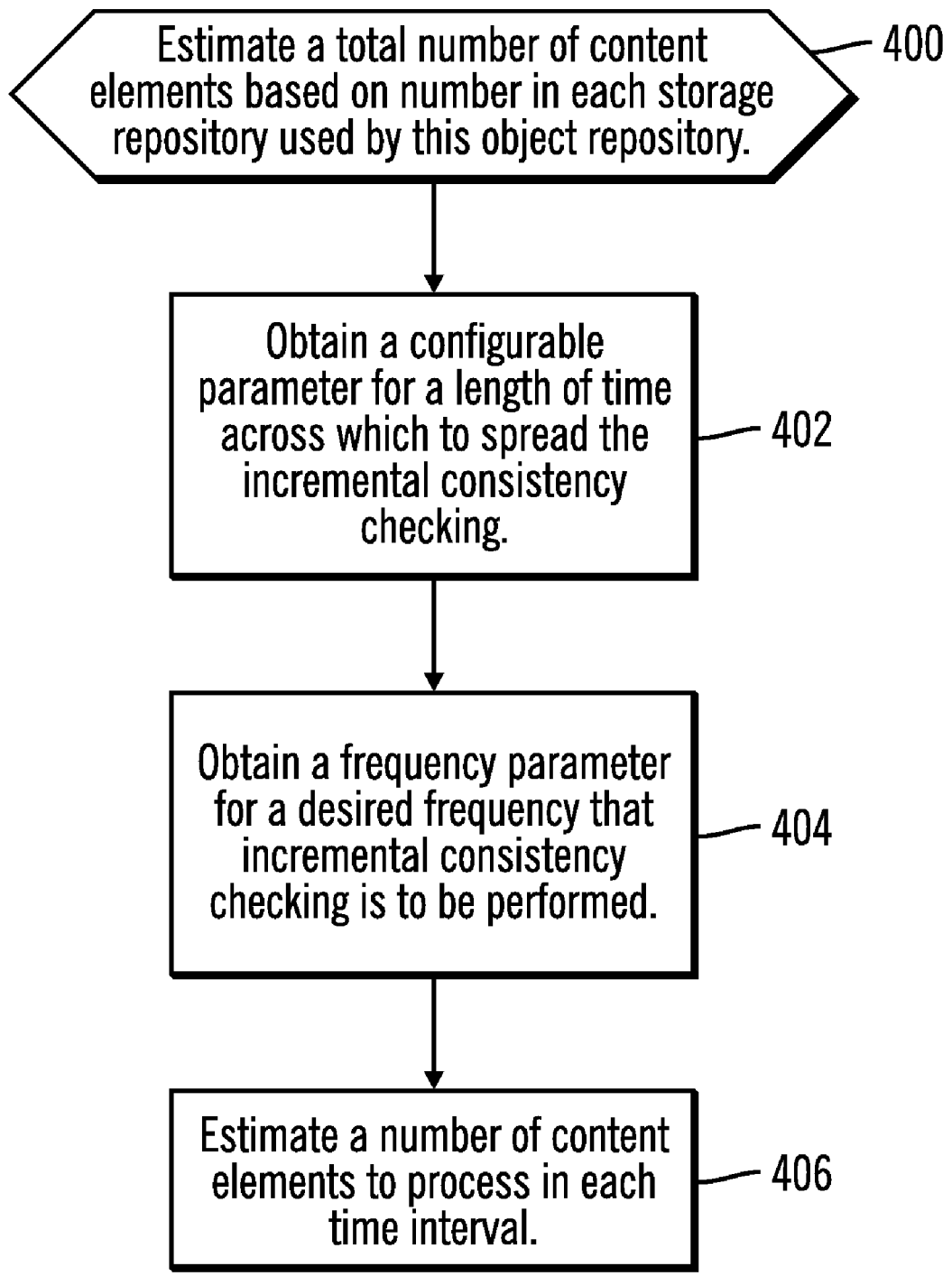
FIG. 4 illustrates logic performed by an incremental consistency checker for calculating how often to schedule the background job and how many content elements are to be processed in each time interval in accordance with certain embodiments.

FIG. 4 illustrates logic performed by the incremental consistency checker 108 for calculating how often to schedule the background job and how many content elements 162a . . . 162n are to be processed in each time interval in accordance with certain embodiments. Control begins in block 400 with the incremental consistency checker 108 estimating a total number of content elements 162a . . . 162n based on a number in each storage repository 160a . . . 160n used by the object repository 120. In certain embodiments, there is a count persisted for each storage repository 160 in the metadata about content storage repositories 146, and the number of storage repositories 160 per object repository 120 is not expected to be large.

In block 402, the incremental consistency checker 108 obtains a length parameter (from the configurable parameters 150) for a length of time across which to spread the incremental consistency checking job (also referred to as time span). For example, the length of time may be 14 days. In certain embodiments, the length parameter is configurable. The configurable parameters 150 may be maintained in a variety of ways. For example, the configurable parameters 150 may be maintained in configuration files or in additional databases and may be configurable by an administrator using an administrative application or simply for internal tuning purposes by the software development organization.

In block 404, the incremental consistency checker 108 obtains a frequency parameter (from the configurable parameters 150) for a desired frequency that the incremental consistency checking job is to be performed. In certain embodiments, the frequency parameter is not configurable. For example, one minute may be the frequency and, given that there are 20,160 minutes in 14 days, there are 20,160 time intervals that work can be performed.

In block 406, the incremental consistency checker 108 estimates a number of content elements 162a . . . 162n to process in each time interval. For example, if there are an estimated 1,000,000 content elements 162a . . . 162n referenced in the object repository 120, then, approximately 50 content elements 162a . . . 162n are processed during each time interval. However, in certain embodiments, the incremental consistency checker 108 processes a minimum number of content elements 162a . . . 162n each time interval, for example 100 content elements 162a . . . 162n. If the estimated number of content elements 162a . . . 162n per time interval is less than the desired minimum, then the incremental consistency checker 108 increases the estimated time interval accordingly. So, with this example, the estimated time interval is increased to two minutes.

Thus, in this example, the scheduling of the incremental consistency checking job is based on the incremental consistency checking job running every two minutes to process 100 content elements 162a . . . 162n in each time interval. The actual number of content elements 162a . . . 162n processed may not be exactly 100 content elements 162a . . . 162n because the one or more queries are issued for content holding objects 130 in the object repository 120, and it is difficult to predict how many content elements 162a . . . 162n there are per content holding object. In certain embodiments, the incremental consistency checker 108 adjusts the time interval when the incremental consistency checking job is to run again based on the overall number of content elements processed during the current time interval.

In addition to adjusting the time intervals to allow for the actual number of content elements 162a . . . 162n that get processed, the incremental consistency checker 108 may run into the case in which all of the content elements 162a . . . 162n cannot be processed in the desired length of time (i.e., time interval). This may occur if there are too many content holding objects 130 with content in the object repository 120 to process in each desired time interval. When this occurs, the incremental consistency checker 108 detects that the next time interval is already late and reschedules the incremental consistency checking job to run immediately after completing the current time interval.

Thus, the incremental consistency checker 108 issues one or more queries for a number of content holding objects 130 in the object repository 120. The content holding objects 130 are then processed to verify that the content they contain is consistent between the object repository 120 and the content repository 160. In certain embodiments, the incremental consistency checker 108 does not issue further queries until the time interval has elapsed, calculated so the entire object repository 120 is processed in the configurable length of time across which to spread the incremental consistency checking job (i.e., time span).

The following is an example Structured Query Language (SQL) query that the incremental consistency checker 108 may issue for a group of content holding objects within a single time interval:

```
SELECT TOP N [all columns necessary to access content] FROM
DocVersion/Annotation WHERE content_object_id > [previous_ID]
AND create_date < [job start time] ORDER BY content_object_id
```

The content_object_id column is the primary key column of the DocVersion and Annotation tables so it is possible to process some group of content holding objects at one time interval of the overall incremental consistency checking job, then continue that incremental consistency checking job at the next time interval, continuing from the last content holding object that was processed. The DocVersion and Annotation tables are two tables that hold rows that represent content holding objects 130—Documents and Annotations. A row in a DocVersion table represents a particular version of a document object. Columns of those tables include properties about those content holding objects 130 (e.g., system defined or application defined properties), as well as, metadata about the content elements 162a . . . 162n, including location information.

Because the content_object_id values may be randomly generated, the content holding objects are in effect processed in a random order. So that the total set of content holding objects that are processed is deterministic and doesn't include some content holding objects that may have been created since the incremental consistency checking job started but not others, the "create_date<[job start time]" clause is used to process content holding objects that were created before the current incremental consistency checking job started (the overall incremental consistency checking job that is, not the current time interval). In alternative embodiments, the results are first ordered by create_date and another index is added to the create_date column.

In certain embodiments, the one or more queries are issued for a group of content holding objects that is smaller than the number of content holding objects to be processed in each time interval. Content of content holding objects 130 is stored in one or more content repositories 160 as individual content elements 162a . . . 162n rather than the entire content of the content holding object 130. A content holding object 130 may be associated with multiple content elements. For the purpose of spreading the incremental consistency checking job across some overall time span, the incremental consistency checking job is based on the number of content elements 162a . . . 162n, not the number of content holding objects 130 in the object repository 120. However, the number of rows to select in each query is kept at a consistent level based on the object repository 130 performance preferences.

The incremental consistency checker 108 validates content consistency of content holding objects 130 and content elements 162a . . . 162n and records inconsistencies. Content elements 162a . . . 162n may be said to be held by content holding objects 130. The following sample pseudo code illustrates a query for content holding objects 130 in the object repository 120 and the validation of the content elements 162a . . . 162n associated with those content holding objects 130:

```
While number_of_content elements_processed <
    number_to_process_per_time interval
    Query for N number of content holding objects
    For each content holding object in results
        For each content element
            Validate the content consistency
        End For
    End For
End While
```

The incremental consistency checker 108 also accounts for the end condition when all content holding objects 130 and content elements 162a . . . 162n have been processed.

In certain embodiments, the background incremental consistency checking job to carry out this consistency checking can be built on an infrastructure similar to other jobs within content server 102, such as the background job to process asynchronous event subscriptions that have fired. For example, in certain embodiments, an application can subscribe to certain events in the content server 102 and attach application defined actions to be carried out. An example is an application defined action when a document is checked in. A similar job infrastructure may be implemented in the content server 102 to process these asynchronous events.

In certain embodiments, the incremental consistency checking jobs structure 140 is a database table that contains rows that represent the incremental consistency checking jobs that are scheduled to be run, currently active, complete or failed. The columns of the incremental consistency checking jobs structure 140 implement the behavior of lease time, whether job is scheduled, active, complete, failed, etc.

To achieve the incremental behavior, the incremental consistency checking job runs and carries out the consistency checking for one time interval, then schedules the incremental consistency checking job to be run again at the next interval. For an active incremental consistency checking job, a "lease time" column in the incremental consistency checking jobs structure 140 allows an incremental consistency checking job to "time out". The incremental consistency checking job may be picked up by another incremental consistency checker 108 at another content server 102 in a distributed server environment or the same content server 102 that is shut down and restarted.

Among the information persisted in the incremental consistency checking jobs structure 140 is the last content holding object Id checked so that the incremental behavior can be achieved by continuing the queries from the last content holding object processed the next time the incremental consistency checking job runs.

Also persisted in the incremental consistency checking jobs structure 140 is the time the entire incremental consistency checking job started so that the query for content holding objects can return a deterministic set of content holding objects over the entire length of time across which to spread the incremental consistency checking job.

After an incremental consistency checking job has completed verifying the consistency of content holding objects 130 in the object repository 120, the incremental consistency checking job is put in the complete state. At this time, the incremental consistency checker 108 creates a row for the next incremental consistency checking job to run so that an incremental consistency checking job is always scheduled to be run and the consistency checking runs repeatedly. Periodically, the incremental consistency checking job bootstrap logic 104 checks whether one active or scheduled incremental consistency checking job exists within the incremental consistency checking jobs structure 140. This will also cover the initial condition when the content management system is first installed. The table would be empty. The content management system should bootstrap the state and add one row to schedule the job to run sometime in the future.

In certain embodiments, some number of previous incremental consistency checking jobs are retained so that an administrator can examine any failed incremental consistency checks discovered during that incremental consistency checking job. Older incremental consistency checking jobs may be automatically deleted as newer incremental consistency checking jobs are created and run. In certain embodiments, users may manually delete older incremental consistency checking jobs, but, users are not allowed to delete the current incremental consistency checking job that is scheduled to be run or become active as another incremental consistency checking job would just need to be created again to maintain the repeated checking behavior.

In certain embodiments, any inconsistencies that are discovered during the consistency checking process are persisted in the inconsistencies structure 142. In certain embodiments, the inconsistencies structure 142 is a database table. The rows in the inconsistencies structure 142 are conceptually children of the main incremental consistency checking job and are deleted when the main incremental consistency checking job is deleted (after it is complete and ages out or a user manually deletes the incremental consistency checking job).

In certain embodiments, there is a maximum number of inconsistencies that an incremental consistency checking job can discover so an unreasonable number of rows are not added to the inconsistencies structure 142. If the maximum number is exceeded, the incremental consistency checking job is aborted and marked as failed due to maximum inconsistencies.

Thus, embodiments provide incremental consistency checking for the content server 102 with metadata of content holding objects 130 and content in content storage repositories 160a . . . 160n that can become inconsistent with each other. Embodiments proactively identify consistency problems (i.e., inconsistencies) in a content server.

With embodiments, incremental consistency checking is done incrementally by scheduling incremental consistency checking jobs for the sets of the content holding objects during different time intervals so that all of the content holding objects in the object repository are processed.

That is, additional queries are issued until the desired number of content elements to process in an incremental time interval has been reached or all content holding objects in the object repository have been processed. If all content holding objects have been processed, the job is marked complete. If the desired number of content elements to process in a time interval has been reached but all content holding objects have not been processed, the job is scheduled for a subsequent run.

ADDITIONAL EMBODIMENT DETAILS

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including a content holding object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 5:
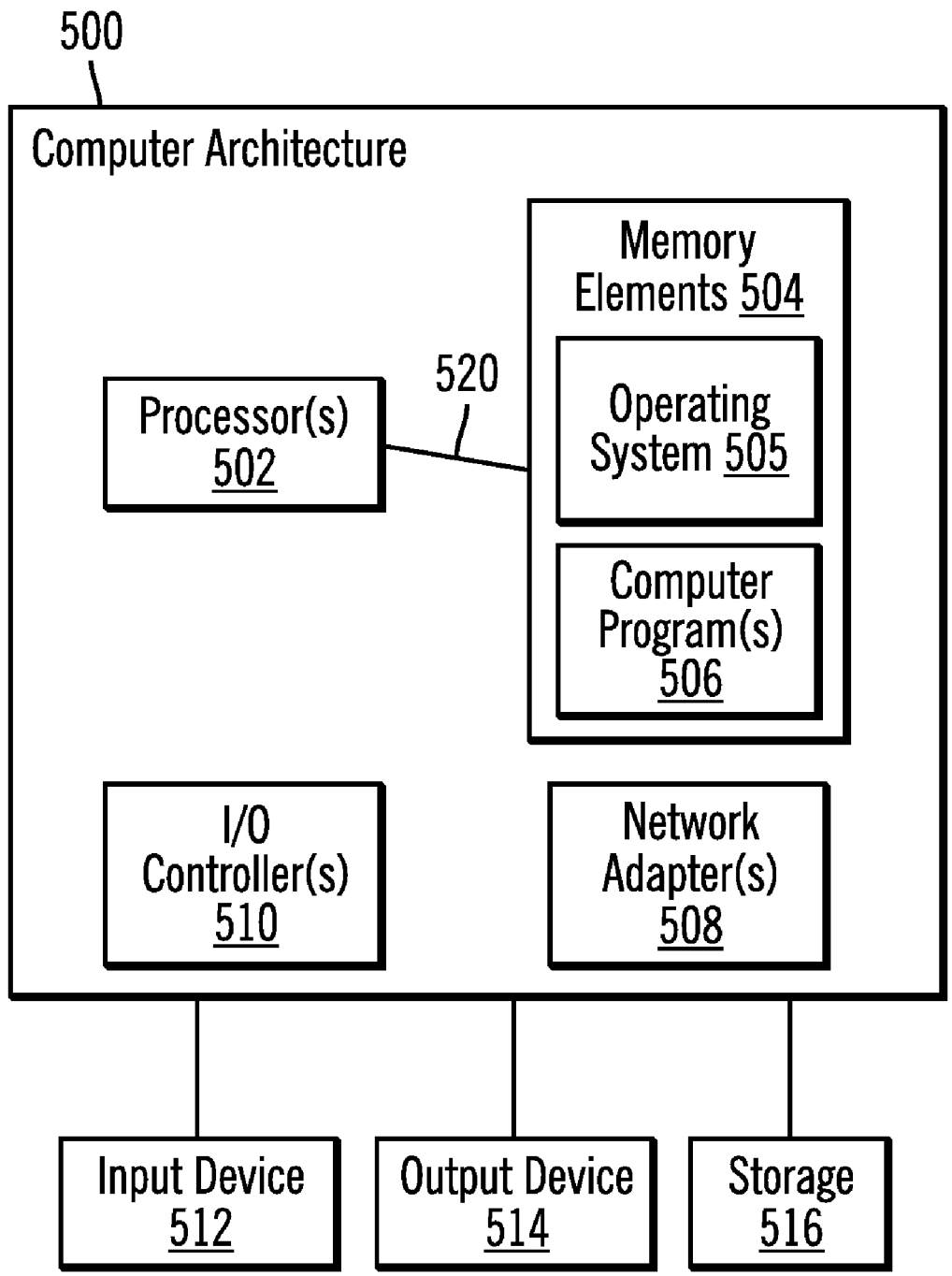
FIG. 5 illustrates a computer architecture that may be used in accordance with certain embodiments.

FIG. 5 illustrates a computer architecture 500 that may be used in accordance with certain embodiments. Content server 102 may implement computer architecture 500. The computer architecture 500 is suitable for storing and/or executing program code and includes at least one processor 502 coupled directly or indirectly to memory content elements 504 through a system bus 520. The memory content elements 504 may include local memory employed during actual execution of the program code, bulk storage, and cache memories which provide temporary storage of at least some program code in order to reduce the number of times code must be retrieved from bulk storage during execution. The memory content elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory content elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, content elements, and/or components, but do not preclude the presence or addition of one or more other features, integers, steps, operations, content elements, components, and/or groups thereof.

The corresponding structures, materials, acts, and equivalents of all means or step plus function content elements in the claims below are intended to include any structure, material, or act for performing the function in combination with other claimed content elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A computer-implemented method, comprising:
 identifying, using a processor of a computer, an incremental consistency checking job;
 during a run of the incremental consistency checking job, issuing one or more queries for a set of content holding objects in an object repository that are to be verified;
 for each of the issued one or more queries, verifying whether content in the set of content holding objects in the object repository and associated content elements in a content repository are consistent;

in response to determining that a desired number of content elements to process in a current time interval has been reached and not all of the content holding objects in the object repository have been processed, scheduling the incremental consistency checking job for a subsequent run; and adjusting a subsequent time interval for the subsequent run based on a number of content elements processed during the current time interval.

2. The method of claim 1, further comprising:

in response to determining that this is a first time that the incremental consistency checking job is run, estimating a number of content elements to process in each time interval; and in response to determining that the estimated number of content elements to process in each time interval is less than a minimum number of content elements to process in each time interval, increasing the interval.

3. The method of claim 1, further comprising:

in response to determining that a first query has completed and the desired number of content elements to process in the current time interval has not been reached, issuing a second query for another set of content holding objects in the object repository for the current time interval.

4. The method of claim 1, further comprising:

in response to determining that all of the content holding objects in the object repository have been processed, marking the incremental consistency checking job complete; and scheduling a new incremental consistency job.

5. The method of claim 1, further comprising:

notifying a user of one of inconsistencies that have been detected and a verification that has been aborted.

6. The method of claim 1, further comprising:

storing an incremental consistency checking jobs structure that contains a row for each incremental consistency checking job that is scheduled to be run, currently active, complete or failed; and in response to determining that the incremental consistency checking job is completed, updating the incremental consistency checking jobs structure.

7. The method of claim 1, further comprising:

storing content holding objects in an object repository, wherein each of the content holding objects is associated with one or more content elements in the content repository.

8. A system, comprising:

a processor; and a storage device coupled to the processor, wherein the storage device stores a program, and wherein the processor is configured to execute the program to perform operations, the operations comprising:

identifying an incremental consistency checking job;

during a run of the incremental consistency checking job, issuing one or more queries for a set of content holding objects in an object repository that are to be verified;

for each of the issued one or more queries, verifying whether content in the set of content holding objects in the object repository and associated content elements in a content repository are consistent;

in response to determining that a desired number of content elements to process in a current time interval has been reached and not all of the content holding objects in the object repository have been processed, scheduling the incremental consistency checking job for a subsequent run; and adjusting a subsequent time interval for the subsequent run based on a number of content elements processed during the current time interval.

9. The system of claim 8, wherein the operations further comprise:

in response to determining that this is a first time that the incremental consistency checking job is run, estimating a number of content elements to process in each time interval; and in response to determining that the estimated number of content elements to process in each time interval is less than a minimum number of content elements to process in each time interval, increasing the interval.

10. The system of claim 8, wherein the operations further comprise:

in response to determining that a first query has completed and the desired number of content elements to process in the current time interval has not been reached, issuing a second query for another set of content holding objects in the object repository for the current time interval.

11. The system of claim 8, wherein the operations further comprise:

in response to determining that all of the content holding objects in the object repository have been processed, marking the incremental consistency checking job complete; and scheduling a new incremental consistency job.

12. The system of claim 8, wherein the operations further comprise:

storing an incremental consistency checking jobs structure that contains a row for each incremental consistency checking job that is scheduled to be run, currently active, complete or failed; and in response to determining that the incremental consistency checking job is completed, updating the incremental consistency checking jobs structure.

13. The system of claim 8, wherein the operations further comprise:

storing content holding objects in an object repository, wherein each of the content holding objects is associated with one or more content elements in the content repository.

14. A computer program product comprising a computer readable storage device including a computer readable program, wherein the computer readable program when executed by a processor on a computer causes the computer to:

identify an incremental consistency checking job;

during a run of the incremental consistency checking job, issue one or more queries for a set of content holding objects in an object repository that are to be verified;

for each of the issued one or more queries, verify whether content in the set of content holding objects in the object repository and associated content elements in a content repository are consistent;

in response to determining that a desired number of content elements to process in a current time interval has been reached and not all of the content holding objects in the object repository have been processed, schedule the incremental consistency checking job for a subsequent run; and adjust a subsequent time interval for the subsequent run based on a number of content elements processed during the current time interval.

15. The computer program product of claim 14, wherein the computer readable program when executed by the processor on the computer causes the computer to:
  in response to determining that this is a first time that the incremental consistency checking job is run, estimate a number of content elements to process in each time interval; and
  in response to determining that the estimated number of content elements to process in each time interval is less than a minimum number of content elements to process in each time interval, increasing the interval.

16. The computer program product of claim 14, wherein the computer readable program when executed by the processor on the computer causes the computer to:
  in response to determining that a first query has completed and the desired number of content elements to process in the current time interval has not been reached, issue a second query for another set of content holding objects in the object repository for the current time interval.

17. The computer program product of claim 14, wherein the computer readable program when executed by the processor on the computer causes the computer to:
  in response to determining that all of the content holding objects in the object repository have been processed, mark the incremental consistency checking job complete; and
  schedule a new incremental consistency job.

18. The computer program product of claim 14, wherein the computer readable program when executed by the processor on the computer causes the computer to:
  notify a user of one of inconsistencies that have been detected and a verification that has been aborted.

19. The computer program product of claim 14, wherein the computer readable program when executed by the processor on the computer causes the computer to:
  store an incremental consistency checking jobs structure that contains a row for each incremental consistency checking job that is scheduled to be run, currently active, complete or failed; and
  in response to determining that the incremental consistency checking job is completed, update the incremental consistency checking jobs structure.

20. The computer program product of claim 14, wherein the computer readable program when executed by the processor on the computer causes the computer to:
  store content holding objects in an object repository, wherein each of the content holding objects is associated with one or more content elements in the content repository.

* * * * *